UNITED STATES PATENT OFFICE.

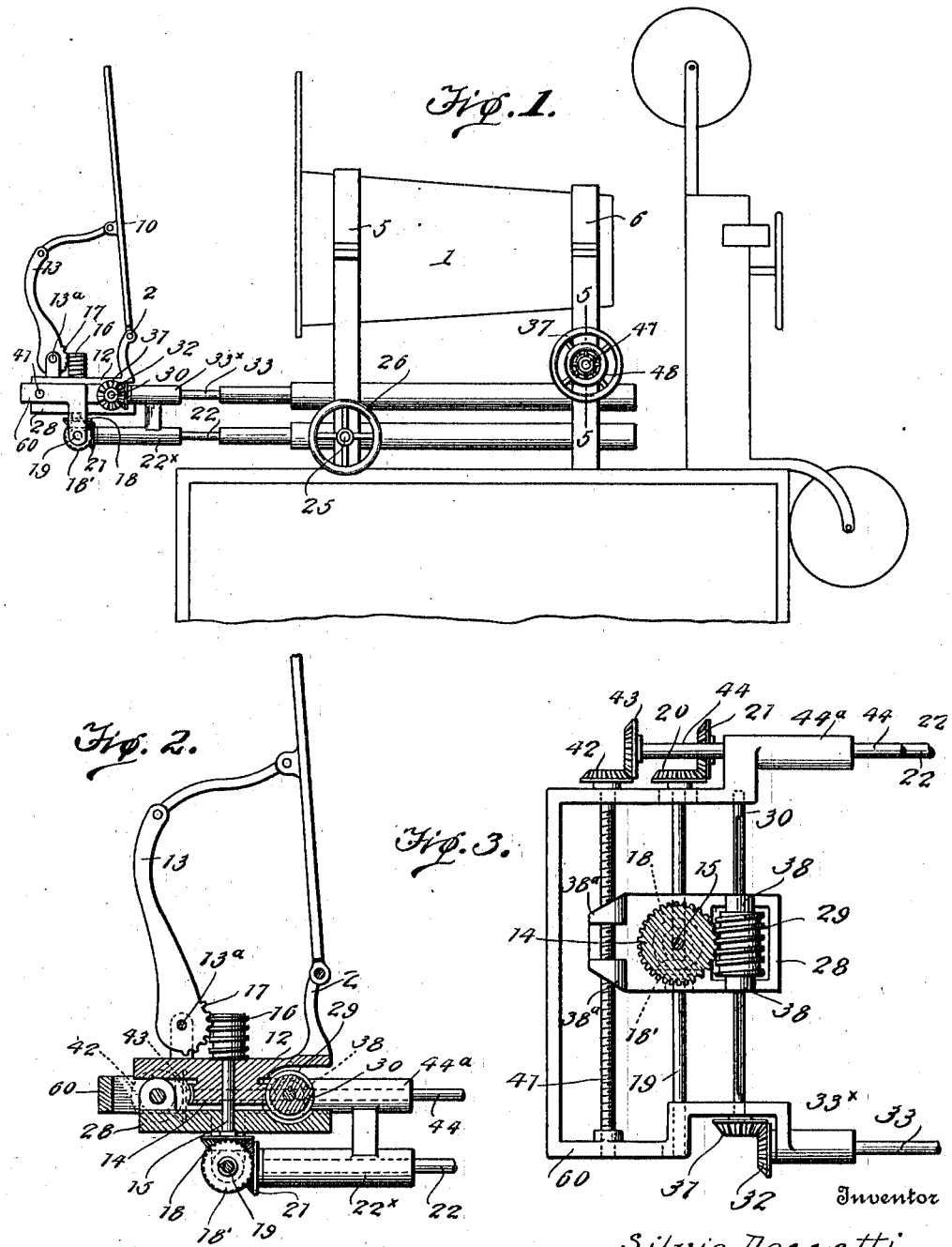

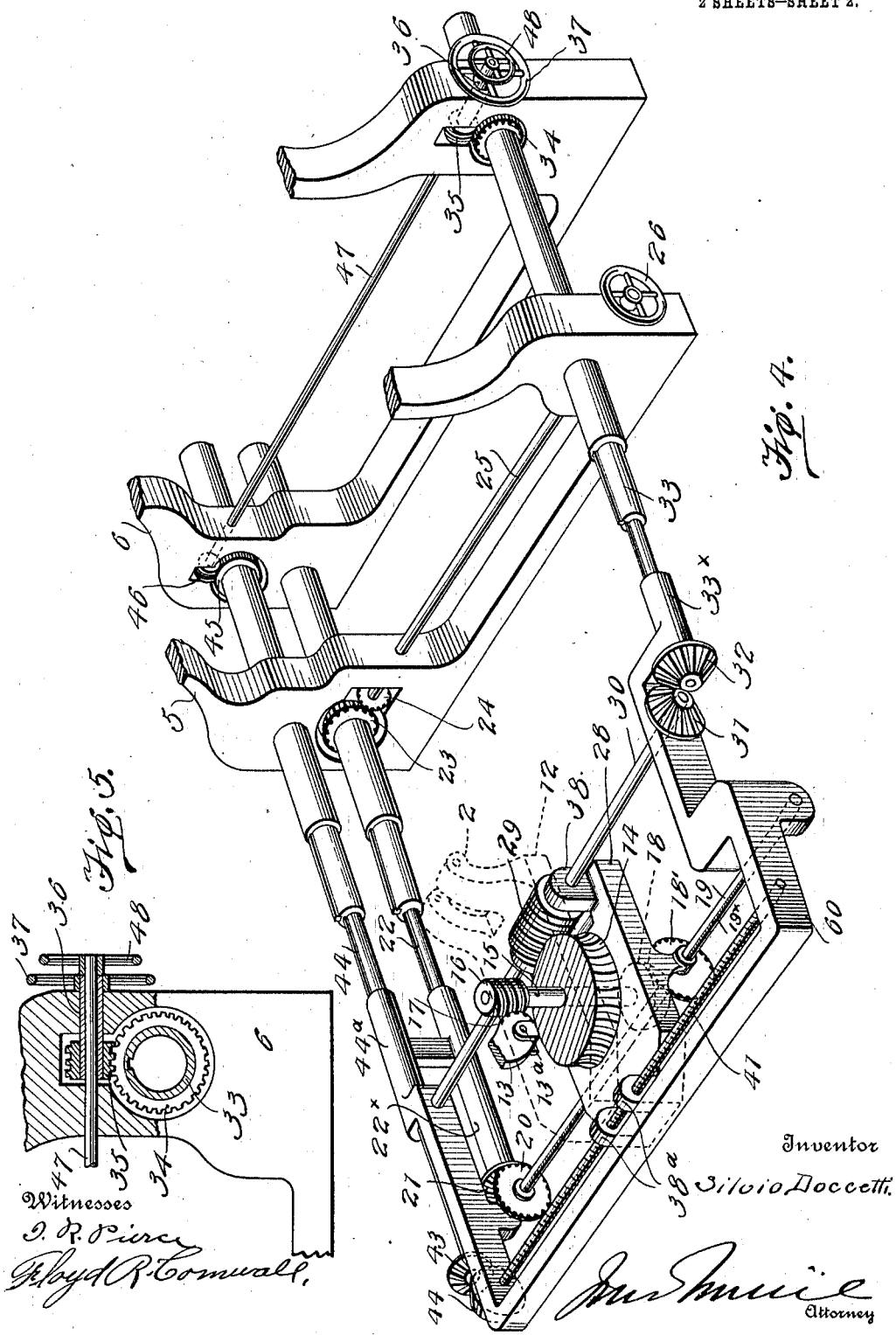

SILVIO DOCCETTI, OF CAGLIARI, ITALY.

DEVICE FOR LIGHTING KINEMATOGRAPHIC PROJECTION APPARATUS BY MEANS OF SUNLIGHT.

1,059,286.

Specification of Letters Patent.    Patented Apr. 15, 1913.

Application filed November 4, 1912.   Serial No. 729,413.

*To all whom it may concern:*

Be it known that I, SILVIO DOCCETTI, a subject of the King of Italy, and residing at 17 Viale Regina Margherita, Cagliari, Italy, have invented certain new and useful Improvements in Devices for Lighting Kinematographic Projection Apparatus by Means of Sunlight, of which the following is a specification, reference being had therein to the accompanying drawing.

It has already been proposed to employ the sun's light for the projection of kinematograph pictures, in order to remove any danger of fire and to permit of kinematographic representations being made also without a strong artificial luminous source. The automatic or semiautomatic heliostats hitherto known, however, are not adapted for being employed with kinematographic projections, as the pictures on the films are not always arranged in complete uniformity with respect to the feeding device of the film and as it is therefore necessary to permanently adjust the luminous source, so as to cause the pictures to be projected into the proper place on the projection canvas or plane.

According to the present invention, the mirror may be moved independently around its two axes of rotation and in a transverse direction of the device with the aid of mechanical transmission gear by means of three hand wheels or other manually operated devices, which are arranged in close proximity with each other on that side of the projection apparatus, where the operator has his place, so that the said apparatus and the lighting device may be controlled by one and the same operator, who may at any moment and with the greatest ease adjust the rays of light in conformity with the position of the pictures on the film.

The drawings show, by way of example, one form of construction of the present device.

Figure 1 is a side elevation of my improved apparatus. Fig. 2 is an enlarged detail longitudinal section of the operating mechanism. Fig. 3 is a plan view of the parts shown in Fig. 2, the mirror supporting plate being removed. Fig. 4 is a diagrammatic perspective view of the operating mechanism, the mirror supporting plate being shown in dotted lines. Fig. 5 is a detail section on the line 5—5, Fig. 5.

The lighting device which forms the object of the present invention, comprises a condenser 1, whose cone-shaped box 4 is carried by two frames 5 and 6. The mirror 10 which projects the sun-rays through the condenser into the kinematographic projection apparatus, may be turned at its base on a horizontal pin 2, mounted in a plate 12. To the rear of the mirror is pivoted a toggle lever 13 whose lower end is pivoted at 13ª, to a supporting plate 12, and is formed with segmental teeth 17. These teeth mesh with a worm 16, on a vertical shaft 15, which passes loosely through an opening in the plate 12. On the lower end of the vertical shaft 15, is a beveled gear wheel 18, which meshes with a beveled gear wheel 18' splined on a transverse shaft 19. Mounted on the opposite end of the transverse shaft 19, is a beveled gear wheel 20, which meshes with a beveled gear wheel 21, mounted on the outer end of a telescopic shaft 22, which is mounted in a bearing 22ˣ, and the frames 5 and 6. Mounted on the shaft adjacent the frame 5, is a beveled gear wheel 23, which meshes with a beveled gear wheel 24 on a shaft 25. The shaft 25 is mounted in the frame 5 and may be rotated by means of the hand wheel, 26. By rotating the hand wheel 26, the gearing will operate the vertical shaft 15, and the toggle lever 13, and cause the mirror 10 to tilt on the horizontal pin 2.

On the under side of the supporting plate 12, is fastened a worm wheel 14, through which the shaft 15 freely passes. Under the plate 12, and supporting the worm wheel 14, is a base plate 28, formed near its forward end with a pair of ears 38, and near its rear end are ears 38ª. Extending through the ears 38, is a horizontal shaft 30, and spined thereon and confined between the ears 38, is a worm 29, which meshes with the worm gear 14. On one end of shaft 30, is a beveled gear wheel 31, which meshes with a beveled gear wheel 32, mounted on the outer end of a telescopic shaft 33, supported in a bearing 33ˣ, and the frames 5 and 6.

On the telescopic shaft 33, adjacent frame 6, is a worm gear 34, and meshing with same is a worm 35, mounted on a sleeve 36, supported in a suitable bearing in the frame 6. The outer free end of the sleeve is provided with a hand wheel 37.

By rotating the hand wheel 37, the telescopic shaft 33 will be revolved, and through the beveled gears 31 and 32, shaft 30 will be rotated. This movement revolves the worm 29, and worm gear 14, hence the supporting plate 12, and the mirror 10, will be moved on the vertical axis (shaft 15).

The ears 38ª, are formed with threaded openings which receive a threaded shaft 41. On one end of the threaded shaft is a beveled gear wheel 42, and meshing with same is a beveled gear wheel 43, carried on the free end of a telescopic shaft 44, mounted in a bearing 44ª, and in the frames 5 and 6. On this telescopic shaft 44, adjacent the frame 6, is a worm gear 45, which meshes with a worm 46, mounted on a shaft 47, supported in bearings formed in frame 6. This shaft passes through the sleeve 36, and is provided on its end with a hand wheel 48, located adjacent the hand wheel 37.

When the hand wheel 48, is rotated, shaft 44, is revolved, and through the beveled gears 42 and 43, the threaded shaft 41, is operated. The rotation of shaft 41, will laterally move the base plate 28, supporting plate 12, and the mirror carried thereby. This movement is wholly independent of the horizontal and vertical tilting of the mirror.

By making shafts 22, 33, and 44, telescopic, the mirror may be adjusted toward or from the condenser. To make this adjustment, the operator grasps the frame 60, and moves it in or out as the case may require. It is in the frame 60 that the bearings for the various shafts previously described are formed.

The hand wheels 26, 37, and 48, are located for convenience on the side of the kinematographic apparatus where the operator stands to manipulate the mechanism. These hand wheels are arranged in close proximity to each other, so that at any moment the operator may tilt the mirror horizontally, vertically, or move it laterally, so as to obtain the best position to direct the sun's rays through the condenser.

What I claim is:

1. In an apparatus of the class described, the combination of a frame kinematographic mechanism, a condenser mounted in the frame adjacent the kinematographic mechanism, a mirror spaced from the rear of the condenser, a support for the mirror, a vertical pivot for the support, a horizontal pivot between the mirror and the support, means including gears and a telescopic shaft for operating the vertical pivot to rotate the mirror and its support, means including gears and a telescopic shaft for tilting the mirror on the horizontal pivot, and means including gears and a telescopic shaft for moving the mirror laterally, the telescopic shafts extending between the frame and mirror to permit of the mirror being manually adjusted toward and from the condenser.

2. In an apparatus of the class described, the combination of kinematographic mechanism, a condenser adjacent the kinematographic mechanism, a frame in which the condenser is mounted, a mirror adjacent the rear end of the condenser, telescopic shafts mounted in the frame and extending rearwardly therefrom, a laterally adjustable base plate mounted between the rear ends of the telescopic shafts, a vertical shaft mounted in said base plate, a mirror supporting plate loosely mounted on the vertical shaft, a hinge connection between said plate and the mirror whereby the mirror may be tilted toward and from the condenser, means including gears operated by one of the telescopic shafts to tilt the mirror toward and from the condenser, a worm gear secured on the vertical shaft, a worm meshing with the worm gear, a shaft on which the worm is loosely mounted, gears between the last named shaft and one of the telescopic shafts to operate the worm and gear to rotate the supporting plate and mirror, a screw engaging with the base plate, and gears between the screw and one of the telescopic shafts to operate said screw to laterally adjust the mirror and its support, the telescopic shafts extending between the frame and the mirror to permit of the mirror being manually longitudinally adjusted toward and from the condenser.

3. In an apparatus of the class described, the combination of a frame, a condenser mounted in the frame, a supporting plate, a mirror horizontally hinged to the supporting plate, toggle levers pivoted to the rear of the mirror, one of said levers being pivoted at its lower end to the supporting plate and formed with teeth, a vertical shaft loosely mounted in the supporting plate, a worm gear secured to the vertical shaft and meshing with the teeth on the toggle lever, a gear on the vertical shaft, a telescopic shaft arranged parallel with the longitudinal axis of the condenser, gears between the telescopic shaft and the gear on the vertical shaft, means for rotating the telescopic shaft whereby to tilt the mirror, means for rotating the supporting plate and the mirror, and means for laterally adjusting the mirror, the telescopic shaft extending between the frame and the mirror to permit of the mirror being longitudinally adjusted toward and from the condenser.

4. In an apparatus of the class described, the combination of a frame, a condenser mounted in the frame, a supporting plate, a mirror horizontally hinged to the supporting plate, means between the frame and the mirror including a telescopic shaft for tilting the mirror on the hinge, a laterally movable base plate operatively connected with the first mentioned plate, means between the frame and the laterally movable base plate including a second telescopic shaft for laterally moving the base plate and the mirror and its supporting plate, a worm gear connected to the supporting plate, a worm meshing with the worm gear, bearings on the base plate between which the worm is confined, a shaft loosely supported in the bearings and on which the worm is splined, a third telescopic shaft, gears between the third mentioned telescopic shaft and the shaft on which the worm is mounted, and means for operating the third mentioned telescopic shaft to rotate the mirror, the telescopic shafts permitting of the mirror being longitudinally adjusted toward and from the condenser.

5. In an apparatus of the class described, a frame, a condenser mounted in the frame, a mirror adjacent the rear end of the condenser, a supporting plate to which the mirror is horizontally hinged, a worm gear secured to said supporting plate, a base plate located under the supporting plate, a vertical shaft passing through both said plates, means between the upper end of said vertical shaft and the mirror to tilt the latter when the shaft is rotated, means including gearing and a telescopic shaft for rotating the vertical shaft, a worm mounted on the base plate and meshing with the worm gear, means including gears and a telescopic shaft for rotating the worm, whereby to rotate the supporting plate and the mirror, ears on the base plate, said ears having threaded openings, a screw engaging the threaded openings, and means including gears and a telescopic shaft for operating the screw whereby to laterally move the plates and the mirror, the telescopic shafts extending between the frame and the mirror to permit of the mirror being longitudinally adjusted toward and from the condenser.

In witness whereof I, said SILVIO DOCCETTI, have signed this specification at Rome, in the Kingdom of Italy, this 22d day of October, 1912.

SILVIO DOCCETTI.

In the presence of two witnesses—
GIOVANNI VALATELLI,
GUSTAV THADEN.

---

Copies of this patent may be obtained for five cents each, by addressing the " Commissioner of Patents, Washington, D. C."